(12) United States Patent
Felberg et al.

(10) Patent No.: US 11,867,328 B2
(45) Date of Patent: Jan. 9, 2024

(54) PLUG-IN CONNECTION SYSTEM FOR FLUID-CONDUCTING COMPONENTS, IN PARTICULAR OF FIRE EXTINGUISHING SYSTEMS, AND COMPONENT PARTS OF SAID CONNECTION SYSTEM

(71) Applicant: MINIMAX GMBH, Bad Oldesloe (DE)

(72) Inventors: Jan Felberg, Lübeck (DE); Wolfgang Habitzl, Neumitterndorf (AT)

(73) Assignee: Minimax GmbH, Bad Oldesloe (DE)

( * ) Notice: Subject to any disclaimer, the term of this patent is extended or adjusted under 35 U.S.C. 154(b) by 0 days.

(21) Appl. No.: 17/859,521

(22) Filed: Jul. 7, 2022

(65) Prior Publication Data

US 2022/0412488 A1    Dec. 29, 2022

Related U.S. Application Data

(63) Continuation of application No. 16/763,188, filed as application No. PCT/EP2018/082606 on Nov. 26, 2018, now Pat. No. 11,428,352.

(30) Foreign Application Priority Data

Nov. 24, 2017   (DE) .................... 10 2017 127 845.1

(51) Int. Cl.
  *F16L 37/14*   (2006.01)
  *F16L 21/08*   (2006.01)
  *A62C 35/68*   (2006.01)

(52) U.S. Cl.
  CPC ............. *F16L 21/08* (2013.01); *A62C 35/68* (2013.01)

(58) Field of Classification Search
  CPC ......... F16L 21/08; F16L 37/12; F16L 37/142; F16L 37/14; F16L 37/146; F16L 37/148; F16L 2201/10; F16L 27/08
  See application file for complete search history.

(56) References Cited

U.S. PATENT DOCUMENTS

| 7,963,569 B2 * | 6/2011 | Subbaraman ..... B29C 66/52292 285/305 |
| 2012/0280489 A1 | 11/2012 | Bundy et al. |
| 2017/0120171 A1 | 5/2017 | Morris |

FOREIGN PATENT DOCUMENTS

| DE | 29 02 278 B1 | 5/1980 |
| DE | 35 19 773 A1 | 12/1986 |

(Continued)

OTHER PUBLICATIONS

Translation JP61-277796 (Year: 1986).*

(Continued)

*Primary Examiner* — Aaron M Dunwoody
(74) *Attorney, Agent, or Firm* — Perkins Coie LLP (57) ABSTRACT

A plug-in connection system for fluid-conducting components of fire extinguishing systems that has a first component having an outer peripheral surface and a first recess in the peripheral surface, and a second component having an inner peripheral surface and a second recess in the inner peripheral surface, wherein the first and the second component can be plugged into one another such that the recesses lie opposite one another and define a locking element channel. A locking element which can be inserted into the locking element channel until an interlock position is reached and at least part of which engages in both recesses in the interlock position. A locking element safety device is provided for reversibly releasably securing the locking element on the first and/or second component.

12 Claims, 9 Drawing Sheets

(56) References Cited

FOREIGN PATENT DOCUMENTS

| | | |
|---|---|---|
| DE | 10 2009 053 696 A1 | 5/2011 |
| DE | 10 2011 006 097 A1 | 9/2012 |
| GB | 652 986 A | 5/1951 |
| JP | 61-277796 * | 12/1986 |
| WO | WO 2017/075305 A1 | 5/2017 |
| WO | WO 2017/137077 | 8/2017 |

OTHER PUBLICATIONS

International Search Report with English translation, International Application No. PCT/EP2018/082606 (published under WO 2019/102014), 8 pages (dated Apr. 24, 2019).

\* cited by examiner

PLUG-IN CONNECTION SYSTEM FOR FLUID-CONDUCTING COMPONENTS, IN PARTICULAR OF FIRE EXTINGUISHING SYSTEMS, AND COMPONENT PARTS OF SAID CONNECTION SYSTEM

PRIORITY CLAIM AND INCORPORATION BY REFERENCE

This application is a continuation of U.S. patent application Ser. No. 16/763,188, filed May 11, 2020, which is a 35 U.S.C. § 371 application of International Application No. PCT/EP2018/082606, filed Nov. 26, 2018, which claims the benefit of German Application No. 10 2017 127 845.1 filed Nov. 24, 2017, each of which is incorporated by reference in its entirety.

TECHNICAL FIELD

The present invention relates to a plug-in connection system for fluid-conducting components, in particular for fluid-conducting components of fire extinguishing systems.

The invention also relates to a first and second component and to a locking element for such a plug-in connection system.

BACKGROUND AND SUMMARY OF THE INVENTION

Plug-in connection systems of the kind initially specified are known from GB 652,986, for example, for the purpose of interconnecting rigid pipes for the transport of liquids.

As with other components, particularly fluid-conducting components during initial installation, but also later during maintenance or replacement of defective components, it is necessary to release and reconnect the connection points between the first and second components. This requires a considerable amount of time in practice. Interlocking systems of the kind initially specified provide assistance in this respect, in that, by inserting the locking element into the locking element channel formed between the components, an interlock safety device is provided that can be installed very quickly and above all that can also be removed in a short time. Due to the locking element in the locking element channel engaging not only in the recess of the first component, but also in the recess of the second component, the components cannot be unplugged from each other as long as the locking element is in the locking element channel. However, a disadvantage of the interlock solution known from the prior art is that the locking can inadvertently release itself on its own, for example as a result of strong vibrations on the components, and in extreme cases slips completely out of the locking element channel. If this happens, the first and second components may separate from each other and, in the worst case, a failure occurs in the system that includes the components. Furthermore, in systems known from the prior art, it is not possible to see from the outside whether the locking element, in the inserted state, is sufficiently long or is too short in length. The latter may be the case when the locking element is intended for a component with a smaller nominal diameter. In that case, the connection will no longer have the prescribed hydraulic bursting strength when components are coupled and the locking element is installed.

The object of the invention was therefore to propose a plug-in connection system of the kind initially specified which eliminates as far as possible the disadvantages found in the prior art. More specifically, the object of the invention was to specify a plug-in connection system that holds the components in the locked state in a highly reliable manner. The object of the invention, in any case, was to specify an alternative plug-in connection system.

The invention achieves its object with a plug-in connection system of the kind initially specified, wherein the plug-in connection system comprises a first component having an outer peripheral surface and a first recess in the peripheral surface, a second component having an inner peripheral surface and a second recess in the inner peripheral surface, wherein the first and the second component can be plugged into one another such that when they are fully plugged into one another the recesses lie opposite one another and define a locking element channel, a locking element which, when the components are fully plugged into one another, can be inserted into the locking element channel until an interlock position is reached and which engages at least partially in both recesses in the interlock position, and a locking element safety device for reversibly releasably securing the locking element on the first and/or second component. The approach taken by the invention is that the locking element loses its locking function only if it can remove itself from the locking element channel. Providing a locking element safety device for securing the chain reversibly releasably to the first and second component ensures that any automatic and inadvertent release of the chain is meticulously prevented, while at the same time the safety device can be attached within a short time.

In a preferred development of the invention, the locking element safety device has a retainer which is designed to prevent the locking element from inadvertently leaving the locking element channel completely. The retainer, in other words, is not provided so as to prevent any movement at all of the locking element within the locking element channel, but merely to prevent complete removal of the locking element from the first or second component.

In a preferred embodiment of the invention, the locking element safety device has an engagement member corresponding to the retainer and embodied at the end of the locking element. The retainer is preferably arranged on the first or second component and can be moved back and forth between an interlock position and a release position. The retainer preferably projects in the locking position at least so far into the locking element channel that the engagement member of the locking element is prevented from sliding out of the locking element channel.

For that purpose, the retainer preferably has an obstruction body that can be moved towards or away from the locking element channel, such as a pin, a screw or the like. The essential aspect is that the retainer is able to create a partial obstruction in the locking element channel, which the locking element, or at least the engagement member of the locking element, is unable to pass. The engagement member is preferably provided in the form of a sliding body whose shape is adapted to the cross-section of the locking element channel and which has a recess for receiving the obstruction body when in its obstruction position.

It is particularly preferred that the retainer has a spring-loaded safety element as obstruction body, for example a spring-loaded thrust piece or locking pin that can be screwed into the first or the second component, the safety element being positioned relative to the locking element channel in such a way that it can be displaced by the chain sliding through the locking element channel, but when the engagement member of the chain reaches the retainer, it enters the locking element channel and comes into contact with the engagement member in order to serve as an end stop. Depending on the geometry of the engagement member, it is possible in preferred embodiments for the chain to continue moving after overcoming the spring biasing force of the safety element. However, this still prevents the chain from being pulled out inadvertently.

In another preferred embodiment, a channel end section into which the second recess opens is formed in such a way in the second component that the channel end section is part of the locking element channel and is dimensioned for insertion and removal of the chain into and out of the locking element channel, preferably with a clearance fit in relation to the locking element. The retainer is preferably arranged in the region of the channel end section in such a way that the engagement member of the locking element completely unblocks at least the first recess when it is in contact with the retainer. In this embodiment, it is not necessary to remove the locking element completely from the first or second component. The locking element can remain in its stop position at the retainer, and the first and second components can nevertheless be released from each other.

In a preferred configuration, the channel end section is open towards an outer peripheral surface of the second component. The chain thus exits the plug-in connection system at the outer peripheral surface, making it easy to access the locking element channel in order to interlock the plug-in connection system.

As an alternative or in addition to the retainer, the locking element safety device has a locking element interlock mechanism which is designed to fix the locking element reversibly releasably in the interlock position inside the locking element channel. This results in a significant gain in safety, as the interlock mechanism ensures that the interlock function is always fully maintained by the locking element in the locking element channel, as long as the locking element is fixed in the interlock position.

The locking element interlock mechanism preferably has an interlock element formed at one end of the locking element, preferably opposite the engagement member of the retainer. An interlock receiver for the interlock element is preferably arranged on the first or second component. The interlock receiver and the interlock element are preferably shaped correspondingly to each other, and the interlock receiver is preferably configured to fix the interlock element reversibly releasably.

In preferred embodiments, the interlock receiver and the interlock element are form-lockingly engagable with each other in the interlock position. For that purpose, they have correspondingly shaped protrusions and recesses (for form-locking engagement) or correspondingly shaped contact or engagement surfaces (for a force-fit connection, for example by means of screw fastening). The interlock receiver is preferably mounted pivotably on the first or second component. It is further preferred that the interlock receiver is configured to abut against the first or second component when it holds the interlock element force-lockingly and/or form-lockingly.

Alternatively or additionally, the interlock element is pivotably mounted on the locking element and is preferably configured to abut against the first or second component when it holds the interlock element force-lockingly and/or form-lockingly.

It is further preferred that the interlock receiver can be connected by means of a screw connection with the interlock element of the locking element when the locking element adopts the interlock position. The interlock element and the interlock receiver are preferably positioned relative to each other such that they cannot engage in each other until the locking element has reached its interlock position inside the locking element channel.

In another preferred embodiment, the locking element locking mechanism has a spring element which is operatively connected to the interlocking element or to the interlock receiver and which is configured to exert a force, in the interlock position, on the interlocking element or the interlock receiver that is directed away from the first or second component. In the unlocked state, it is immediately visible to maintenance personnel, due to the interlock element being spaced apart from the receiver, that the locking element safety device is still unlocked. This reduces the risk of neglecting to lock the locking element safety device properly.

In preferred alternative embodiments, the spring element is attached to the interlock receiver or the interlock element and is elastically deformed in such a way, by bringing the interlock element into engagement with the interlock receiver, that a restoring force is built up which acts in the direction of releasing the interlock element from the interlock receiver. This has the advantageous effect that after unlocking, the interlocking element and the receiver are moved away from each other and the interlocking element is easier for the operator to grip. The interlock element preferably has one or more recessed grips and/or protrusions for manually gripping it.

The spring element of the locking element interlock mechanism is preferably a spring-loaded safety element, for example a spring-loaded thrust piece (ball spring) or a locking pin, or a torsion spring, in particular a spiral spring.

In another preferred embodiment, the interlock receiver has a fitting member which is representative of the nominal diameter of the first and second component, and the interlock element has a correspondingly shaped fitting member which is representative of the locking element length that is required for the respective nominal diameter of the first and second component. The fitting members are each configured so that they can engage in each other when the locking element is in the interlock position. This has the effect that the interlock receiver and the interlock element can only be connected to each other if the "matching" fitting members are present and engage in each other. This reliably prevents any undetected use of a locking element that is too short.

According to another embodiment of the invention, a corresponding positioning element for unique alignment of the components with each other is formed on each of the first and second components.

A recess is preferably formed on one of the two components, preferably on a ring which can be rotated around the component, and a corresponding protrusion is preferably provided on the front side of the other of the two components.

It is further preferred that the corresponding positioning elements are arranged in such a way that the first and second components are unable to adopt the fully plugged-in state until the positioning elements engage in each other.

It is particularly preferred that one or both of the positioning elements has or have one or more insertion bevels, which make it easier for the positioning element to engage each other.

It is further preferred that the positioning elements each have a mark on their periphery, the marks on the first and second components each being positioned in such a way that they are aligned with each other when the components are fully plugged into one another. This provides a visual indication that the components are correctly positioned for inserting the locking element, which makes installation easier for the operator.

The invention has been described in the foregoing with general reference to components for fluid-conducting systems. According to the invention, these components can each be selected from the list:

pipes, end caps, or valves, in particular shut-off valves, fluid-conducting flow elements.

The first component in each case is defined as a "male" component, whereas the second component is the matching "female" component. According to the invention, the plug-in connection system thus has, for example, a first pipe having a male connector section and a second pipe having a female connector section, or a fitting having a male connector section and an end cap having a female connector section, or a fitting having a female connector section and a pipe having a male connector section etc., the male connector sections each having the outer peripheral surface, and the female connector sections having the inner peripheral surface.

Valves are understood to be gate valves, quick-release valves, nozzles, diffusers, sprinklers, etc., for example.

According to another preferred embodiment of the invention, the locking element is embodied as a flexible interlock chain having a plurality of chain links which are preferably connected articulatedly to each other. The articulated movement is preferably realized in such a way that the chain links can pivot about a single axis. For the invention, this type of chain provides an optimal compromise between flexibility, on the one hand, and rigidity transversely to the pivot axis, on the other hand, and with the stability this involves. As an alternative to this type of chain, it is also possible, and proposed in preferred embodiments, that the locking element be provided in the form of a flexible but pressure-resistant belt, either smooth or contoured. The relevant criteria are the ability of the locking element to follow the curvature of the locking element channel inside the plug-in connection system, and sufficient stability transversely to the curvature of the locking element channel, i.e., in the longitudinal direction of the components to be connected and thus in the coupling/decoupling direction, in order to fix the components form-lockingly relative to each other.

The invention has been described in the foregoing with reference to the plug-in connection system as a whole. However, the invention is expressed not only in the system as a whole, but also in the individual system components.

In a further aspect, the invention relates to a first fluid-conducting component for a plug-in connection system according to any of the embodiments described in the foregoing, in particular a fluid-conducting component of a fire extinguishing system, comprising an outer peripheral surface and a first recess in the peripheral surface, wherein the first component can be plugged in such a way into a second component which has an inner peripheral surface with a second recess in said inner peripheral surface that in the fully plugged-in state the first and second recesses are arranged opposite one another and define a locking element channel, and wherein the first recess is adapted to engage, when the components are in the fully plugged-in state, in at least part of a locking element which can be inserted into the locking element channel until an interlock position is reached, wherein the first component has at least one part of a locking element safety device for securing the locking element reversibly releasably on the first component.

The first fluid-conducting component has the same advantages of the invention and has the same preferred embodiments as the plug-in connection system according to the invention, for which reason reference is made in this regard to the descriptions above.

In another aspect, the invention relates to a second fluid-conducting component for a plug-in connection system according to one of the preferred embodiments described in the foregoing, in particular a fluid-conducting component of a fire extinguishing system, comprising an inner peripheral surface and a second recess in the peripheral surface, wherein the second component the second component can be plugged in such a way onto a first component which has an outer peripheral surface with a first recess in said outer peripheral surface that in the fully plugged-in state the first and second recesses are arranged opposite one another and define a locking element channel, and wherein the second recess is adapted to engage, when the components are in the fully plugged-in state, in at least part of a locking element which can be inserted into the locking element channel until an interlock position is reached, wherein the second component has at least one part of a locking element safety device for securing the locking element reversibly releasably on the second component.

The second component also has the same advantages and preferred embodiments as the first component and the plug-in connection system according to the invention, for which reason reference is made in this regard also to the descriptions above.

In another aspect, the invention relates to a locking element for a plug-in connection system according to one of the preferred embodiments described in the foregoing, comprising a plurality of locking element members articulatedly attached to one another, wherein the locking element is adapted to be inserted into a locking element channel defined by a first recess in an outer peripheral surface of a first component of the plug-in connection system and a second recess in an inner peripheral surface of a second component of the plug-in connection system when the first and the second component are fully plugged into one another, such that the first and second recess are arranged opposite one another, and to engage at least partially with the first and second recess, wherein the locking element is configured to be secured reversibly releasably to the first and second component by means of a locking element safety device.

The locking element also has the same advantages and preferred embodiments as the first and second components and the plug-in connection system according to the invention as described in the foregoing, for which reason reference is made to the descriptions above.

In another aspect, the invention proposes a plug-in connection system for fluid-conducting components, in particular for fluid-conducting components of fire extinguishing systems, comprising two components which can be plugged into one another and which define a locking element channel between them when in the plugged-in state, and further comprising a flexible locking element which is arranged in the locking element channel and which engages in both components in order to fix them to each other in the axial direction, wherein the plug-in connection system has a retainer which is designed to prevent the locking element from inadvertently leaving the locking element channel completely. The advantages and preferred embodiments described above are simultaneously advantages and preferred embodiments of the plug-in connection system according to this aspect.

In another aspect, the invention proposes a plug-in connection system for fluid-conducting components, in particular for fluid-conducting components of fire extinguishing systems, comprising two components which can be plugged into one another and which define a locking element channel between them when in the plugged-in state, and further comprising a flexible locking element which is arranged in the locking element channel and which engages in both components in order to fix them to each other in the axial direction, wherein the interlock mechanism has an interlock element formed on the locking element and an interlock receiver arranged on one of the components for receiving the interlock element, wherein the interlock mechanism further comprises a spring element which is operatively connected to the interlock element or to the interlock receiver and which is configured to exert a force, in the interlock position, on the interlock element or the interlock receiver that is directed away from the first or second component. The advantages and preferred embodiments described above are simultaneously advantages and preferred embodiments of the plug-in connection system according to this aspect.

In another aspect, the invention proposes a plug-in connection system for fluid-conducting components, in particular for fluid-conducting components of fire extinguishing systems, comprising two components which can be plugged into one another and which define a locking element channel between them when in the plugged-in state, and further comprising a flexible locking element which is arranged in the locking element channel and which engages in both components in order to fix them to each other in the axial direction, and further comprising a locking mechanism, wherein the locking mechanism has an interlocking element formed on the locking element and an interlock receiver arranged on one of the components for receiving the interlocking element, wherein the locking mechanism further comprises a fitting member which is representative of the nominal diameter of the first and second component. The interlock element preferably has a corresponding fitting member which is representative of the locking element length that is required for the respective nominal diameter of the first and second component. It is particularly preferred that the fitting members are each positioned so that they can engage in one another when the locking element is in the interlock position. The advantages and preferred embodiments described above are simultaneously advantages and preferred embodiments of the plug-in connection system according to this aspect.

In another aspect, the invention proposes a plug-in connection system for fluid-conducting components, in particular for fluid-conducting components of fire extinguishing systems, comprising two components which can be plugged into one another and which define a locking element channel between them when in the plugged-in state, and further comprising a flexible locking element which is arranged in the locking element channel and which engages in both components in order to fix them to each other in the axial direction, wherein a corresponding positioning element for unique alignment of the components with each other is formed on each of the first and second components, wherein the corresponding positioning elements are arranged in such a way that the first and second components are unable to adopt the fully plugged-in state until the positioning elements engage in one another, and wherein one or both of the positioning elements have insertion bevels. The advantages and preferred embodiments described above are simultaneously advantages and preferred embodiments of the plug-in connection system according to this aspect.

In another embodiment, the invention relates to the use of a plug-in connection system to couple two components, in particular to couple two fluid-conducting components of a fire extinguishing system. With this aspect, the invention achieves the object initially specified by proposing the use of a plug-in connection system according to one of the preferred embodiments described in the foregoing in order to achieve that purpose.

In another embodiment, the invention relates to a method of coupling two components of a plug-in connection system, in particular two fluid-conducting components of a fire extinguishing system. The invention achieves the object initially specified in respect of the method according to the invention by connecting the components of the plug-in connection system according to one of the preferred embodiments described in the foregoing, in particular by the method comprising the steps of:

plugging the first component and the second component into one another in such a way that a locking element channel between the two components is defined by means of recesses arranged opposite one another, inserting a locking element into the locking element channel until an interlock position is reached in which the locking element engages at least partially in both recesses, and reversibly releasably securing the locking element on the first component and the second component.

The method is preferably developed by securing the locking element on one of the components against loss in the inserted state, in particular by an bringing an engagement member into engagement with an obstruction body that extends at least partially into the locking element channel.

It is further preferred that the method comprises the step of reversibly releasably securing the locking element, in the interlock position inside the locking element channel, to the respective other component to which the retainer is not attached.

Reversibly releasably securing the locking element to the first and second component preferably also includes the step of bringing correspondingly shaped fitting members into engagement, which are arranged in such a way relatively to each other that a predetermined length of the locking element for the nominal diameter of the first and second component must be used in the plug-in connection system so that the fitting members can be brought into engagement with one another.

In another preferred embodiment, the method includes bringing corresponding positioning elements into engagement which are formed on the first and second component for unique alignment of the components with each other, so that the components are unable to adopt the fully plugged-in state until the positioning elements engage in one another.

The preferred variants of using the method according to the invention in accordance with the invention are at the same time preferred embodiments of the inventive devices realizing the aforementioned aspects of the invention. Vice versa, the preferred embodiments of the plug-in connection system according to the aforementioned aspects are simultaneously preferred embodiments of the use according to the invention and of the method according to the invention.

BRIEF DESCRIPTION OF THE DRAWINGS

The invention shall now be described in greater detail with reference to a preferred embodiment and the attached Figures, in which.

MODE(S) FOR CARRYING OUT THE INVENTION

Figure 1:
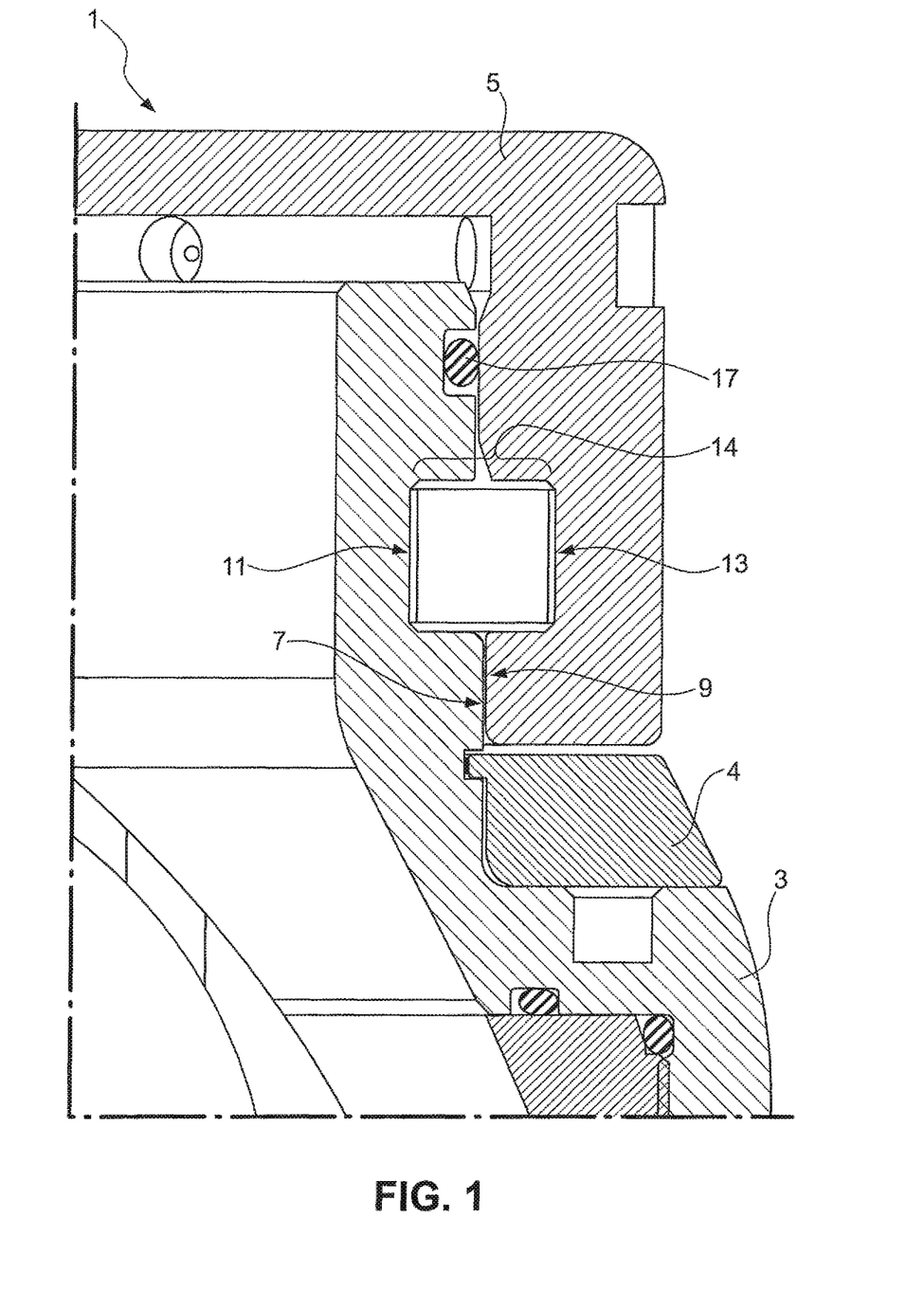
FIG. 1 shows a schematic cross-sectional view of a plug-in connection system according to a preferred embodiment.

FIG. 1 shows a partial cross-sectional view of a plug-in connection system 1 for fluid-conducting components. More specifically, the embodiment shows a first component 3 in the form of a valve body, which is connected to a second component 5 in the form of a blowback prevention cap. First component 3, which has a male connector section, has an outer peripheral surface 7 in the male connector section. Corresponding thereto, second component 5 has a female connector section with an inner peripheral surface 9, which is pushed onto the outer peripheral surface 7 of first component 3. A ring 4 is preferably attached rotatably as a positioning aid to first component 3, and in particular is clipped onto it. The positioning is described in more detail below with reference to FIG. 5.

In outer peripheral surface 7, first component 3 has a first recess 11 in the form of a groove which extends at least partially along the circumference of outer peripheral surface 7. Correspondingly thereto, the second component 5 has a second recess 13 on inner peripheral surface 9, likewise in the form of a groove which extends at least partially along the circumference of inner peripheral surface 9. The first and the second component 3, 5 are inserted so far into each other that they have reached an end position as shown in FIG. 1, which is the fully plugged-in state. In this state, first and second recesses 11, 13 are arranged directly opposite each other, such that they jointly define a locking element channel 14 in which a locking element 15 is arranged. Locking element channel 14 has the same shape as the cross-sectional profile of locking element 15, preferably with a clearance fit in relation to locking element 15. In the embodiment shown, the locking element is shown by way of example as a interlock chain.

By engaging in both the first and second recesses 11, 13, locking element 15 acts as a barb for each of components 3, 5 in relation to the respective other component and prevents the first and second component 3, 5 from being pulled apart.

A sealing element 17 is arranged between the inner and outer peripheral surfaces 7, 9 of first and second components 3, 5 and seals surfaces 7, 9 against fluid leakage.

The locking element safety device according to the invention shall now be described in more detail with reference to FIGS. 2-4e.

Figure 2:
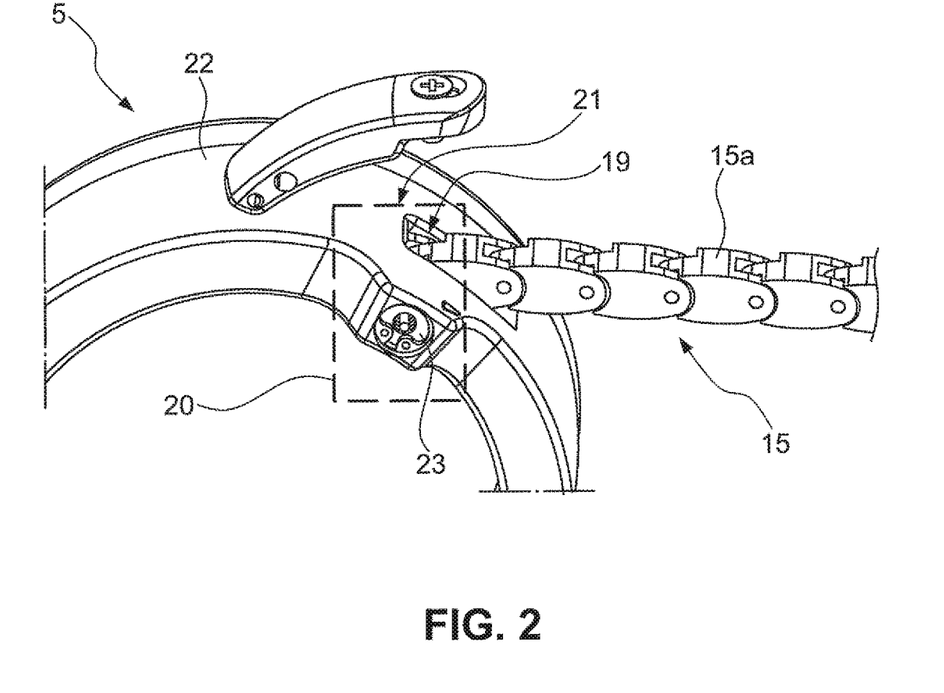
FIG. 2 shows a schematic three-dimensional detail view of the plug-in connection system according to FIG. 1.

FIG. 2 shows a first constituent part of a locking element safety device 20: The second component has a channel end section 21 where locking element 15 is guided out of or fed into second component 5 along locking element channel 14 (FIG. 1). Locking element 15 has a plurality of locking element members 15a which are arranged articulatedly in relation to each other and which can follow the curved course of locking element channel 14 inside locking element channel 14.

At an outer peripheral surface 22 of second component 5, channel end section 21 opens into an opening 19 which matches the size of locking element 15. A retainer 23 having a spring-loaded safety element is positioned in such a way in end section 21 that it secures locking element 15 against inadvertently leaving locking element channel 14 (FIG. 1). The structural design can be seen from FIG. 3, in particular.

Figure 3:
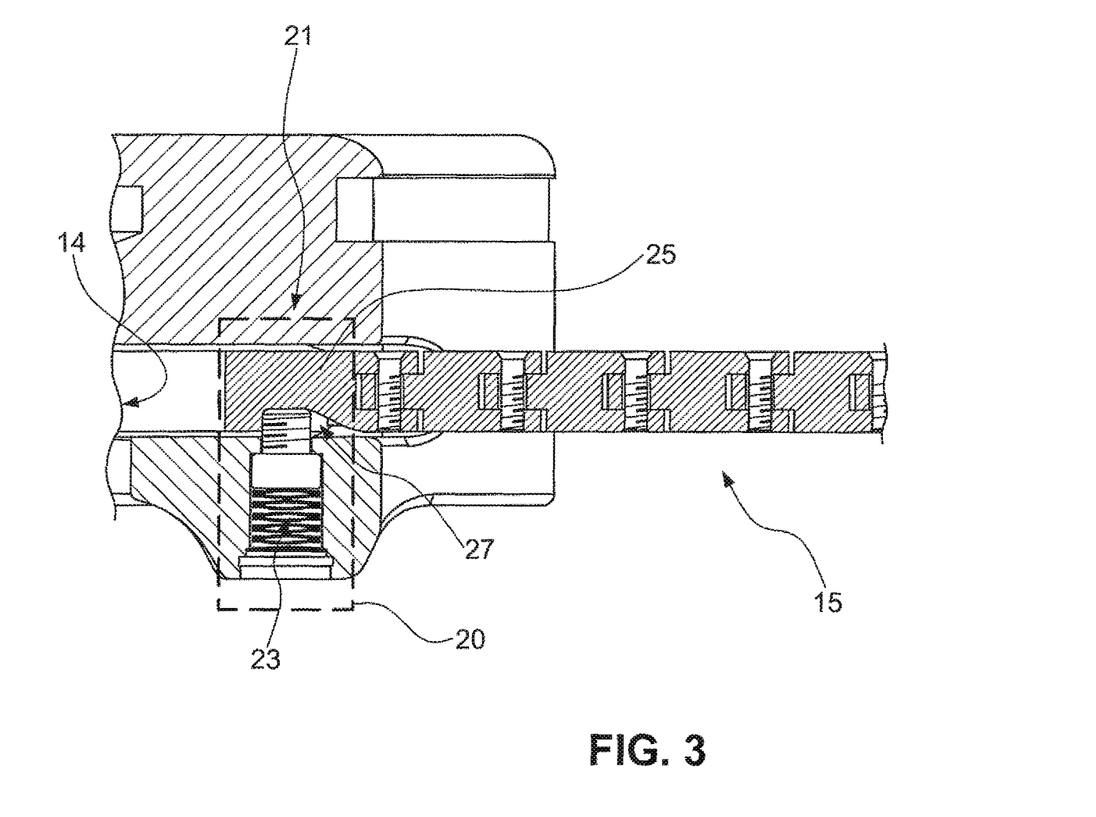
FIG. 3 shows another schematic cross-sectional view of part of the plug-in connection system according to FIGS. 1 and 2.

The retainer 23 positioned in channel end section 21 is positioned in such a way that it extends in a locking position into locking element channel 14. At one end, locking element 15 has an engagement member 25 that corresponds to retainer 23. On engagement member 25, one or more recesses 27 are formed in which retainer 23 engages when in the locking position. Depending on the geometrical layout, any further movement past retainer 23 is impossible without causing destruction. Recesses 27 are provided in the direction of locking element 15 with sliding bevels which allow locking element 15 to be pushed into locking element channel 14 with relatively little force, and to displace the head of retainer 23 out of locking element channel 14.

Retainer 23 is a first functional element of locking element safety device 20. Alternatively or additionally, a second functional element is preferably provided, namely a locking element interlock mechanism 30.

Figure 4A:
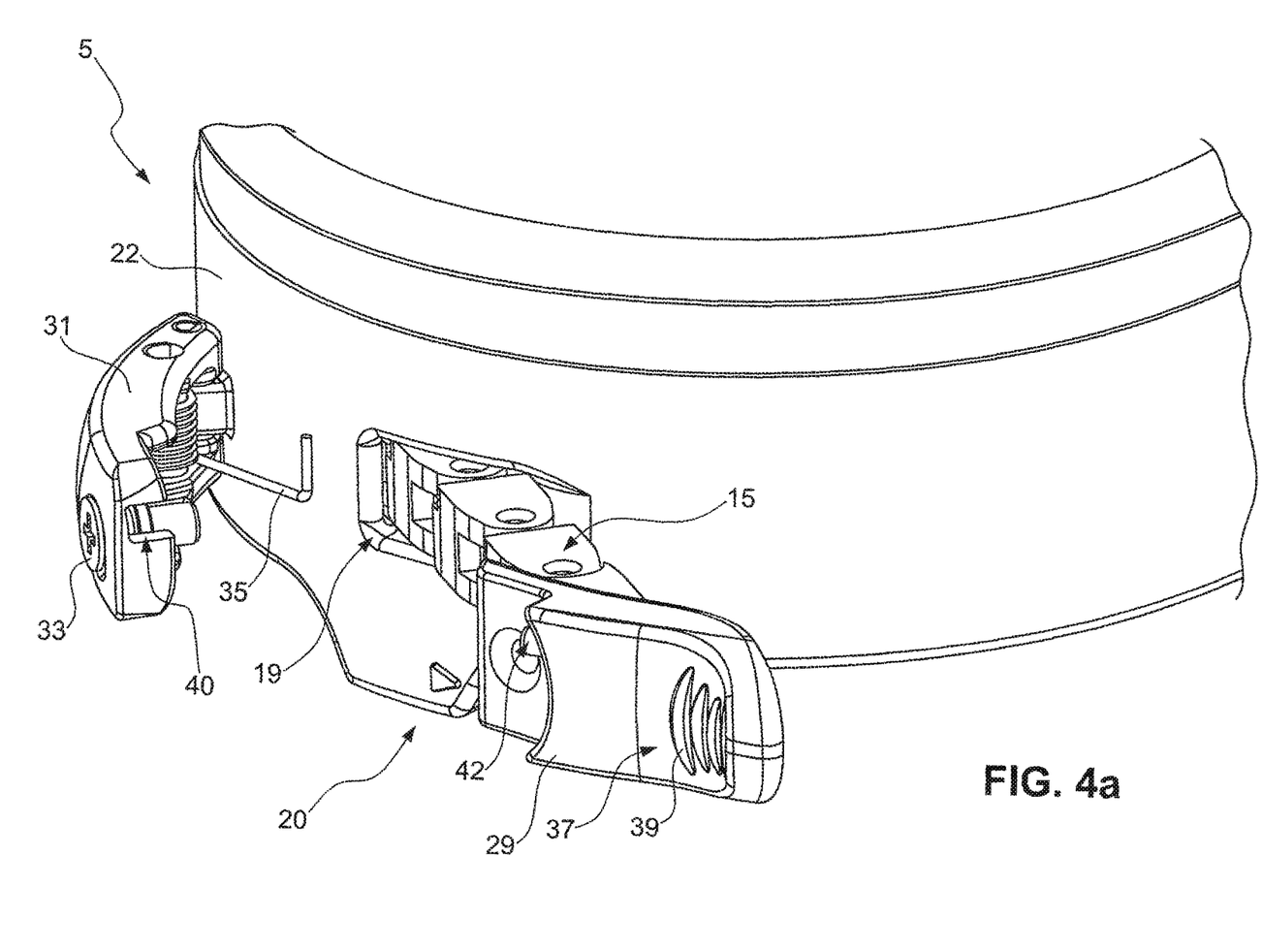
FIGS. 4a-e show a further schematic three-dimensional view of part of the plug-in connection system according to FIGS. 1 to 3.

FIG. 4a shows the locking element interlock mechanism (reference sign 30 in FIG. 5) by way of example. The locking element interlock mechanism is designed to fix locking element 15 reversibly releasably in its interlock position inside locking element channel 14 and for that purpose has an interlock element 29 arranged pivotably at one end of locking element 15 opposite engagement member 25 for retainer 23. Interlock element 29 is configured to be brought into engagement with a corresponding interlock receiver 31 on second component 5 in order to fix locking element 15. In the present embodiment, receiver 31 is in the form of a pivoted lever, and interlock element 29 can be attached form-lockingly with interlock receiver 31 and force-lockingly by means of a safety screw 33 in an interlock position to second component 5. FIG. 4a shows interlock element 29 in a release position in which it is already spaced apart from second component 5. Interlock receiver 31 is pushed away from the peripheral surface 22 of second component 5 by means of a spring element 35 as soon as interlock receiver 31 and interlock element 29 are released from each other. Spring element 35 is preferably designed as a spiral spring and is elastically deformed in such a way when interlock element 29 and receiver 31 are attached that the restoring force causes interlock element 29 to be pushed off. When interlock receiver 31 sticks out from the peripheral surface 22 of second component 5, as shown in FIG. 4a, it can immediately be seen that locking element 15 is either not in the interlock position, or in any case that interlock element 29 is not connected to interlock receiver 31.

Interlock element 29 has a grip recess 37 which preferably faces away from interlock receiver 31. Grip recess 37 preferably has one or more protrusions 39 also. The one or more protrusions 39 are designed to provide an operate with a haptic aid when gripping interlock element 29 in order to push or pull out locking element 15 in or out.

To prevent any inadvertent insertion of a wrong locking element 15, in particular one that is too short, correspondingly designed fitting members 41, 43 are formed on interlock receiver 31 and interlock element 29. In the present embodiment, a fitting member 41 in the form of a recess is formed on interlock receiver 31. A fitting member 43 in the form of a protrusion, for example a pin, is formed on interlock element 29. Fitting member 43 slides into corresponding fitting member 41 when interlock receiver 31 and interlock element 29 come closer to each other. If interlock receiver 31 and interlock element 29 can come fully into contact with each other and both can be brought into contact with peripheral surface 22 of second component 5, the operator automatically knows that he has selected the right locking element 15. If locking element 15 has a different length, i.e., is for a different nominal diameter of second component 5, fitting member 43 would be provided elsewhere or with a different shape, with the result that the fitting members are unable then to be brought into engagement with each other. This is a reliable way of preventing a wrong locking element 15 from being fitted.

FIGS. 4b-e illustrate by way of example how the interlock mechanism operates.

Figure 4B:
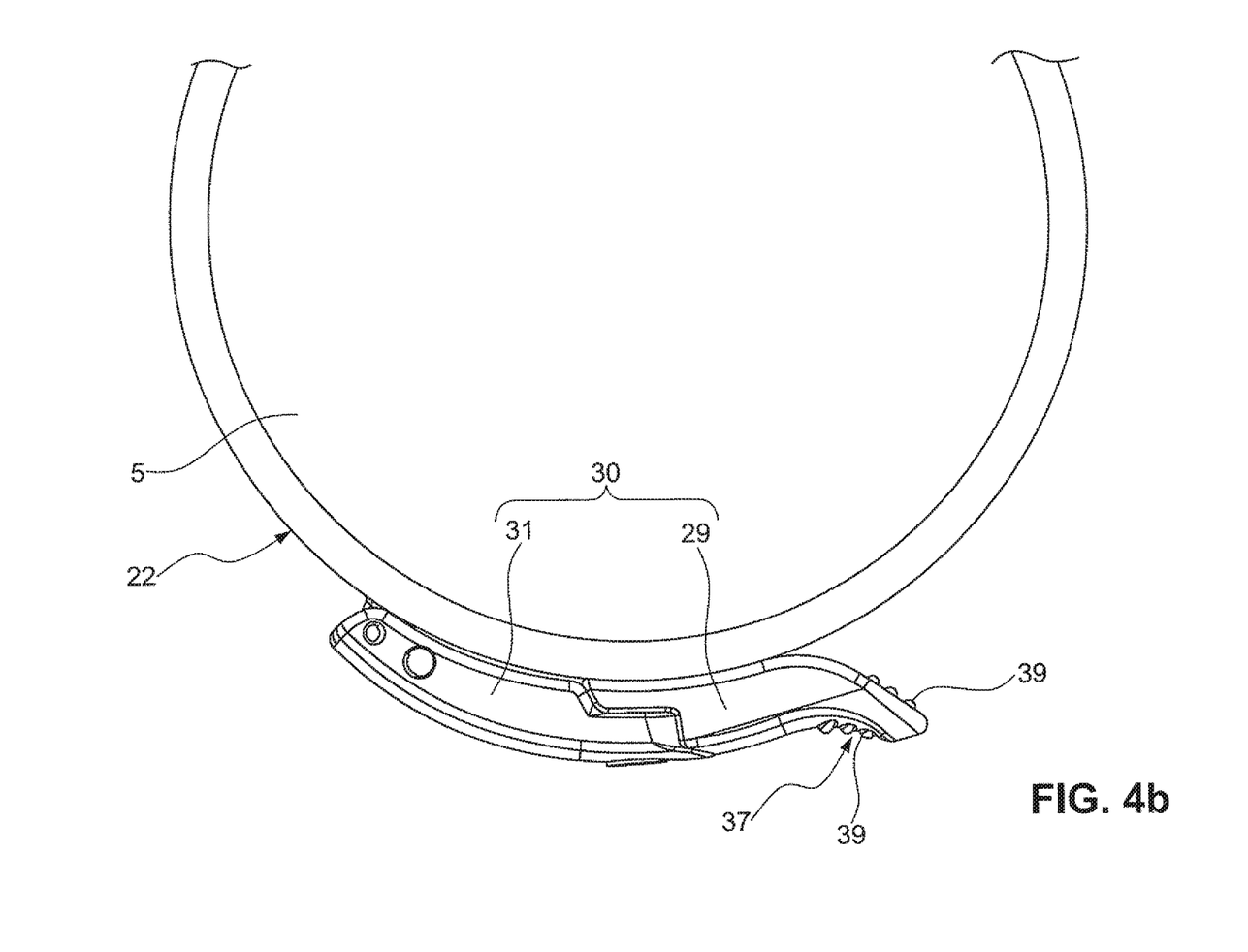

FIG. 4b shows second component 5 while locking element 15 (not shown) is in its interlock position, and locking element interlock mechanism 30 has likewise adopted its interlocked state. In this state, both interlock element 29 and interlock receiver 31 are in contact with the outer peripheral surface 22 of the second component, and safety screw 33 hold the interlock mechanism 30 reversibly releasably together.

Figure 4C:
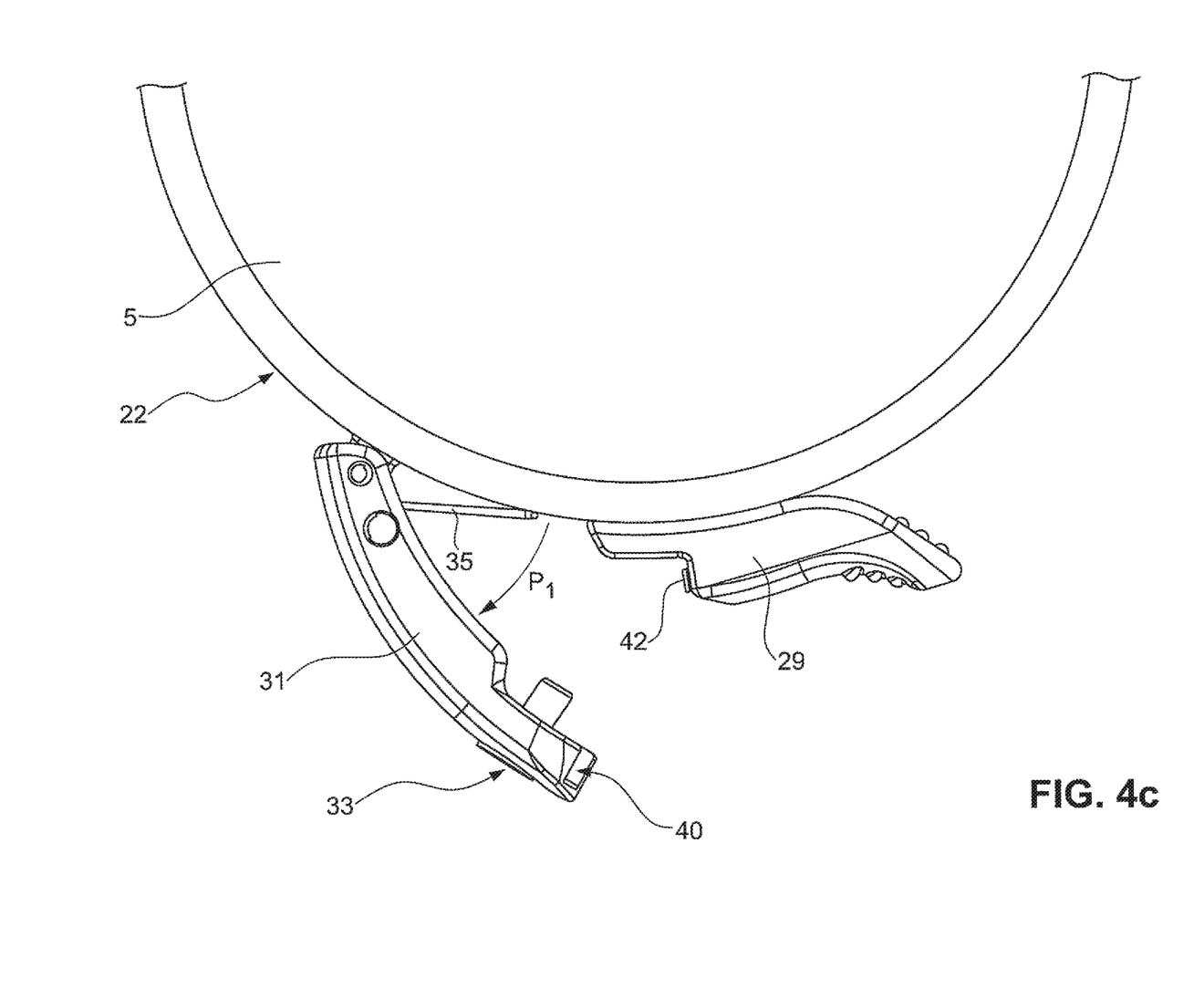
Figure 4D:
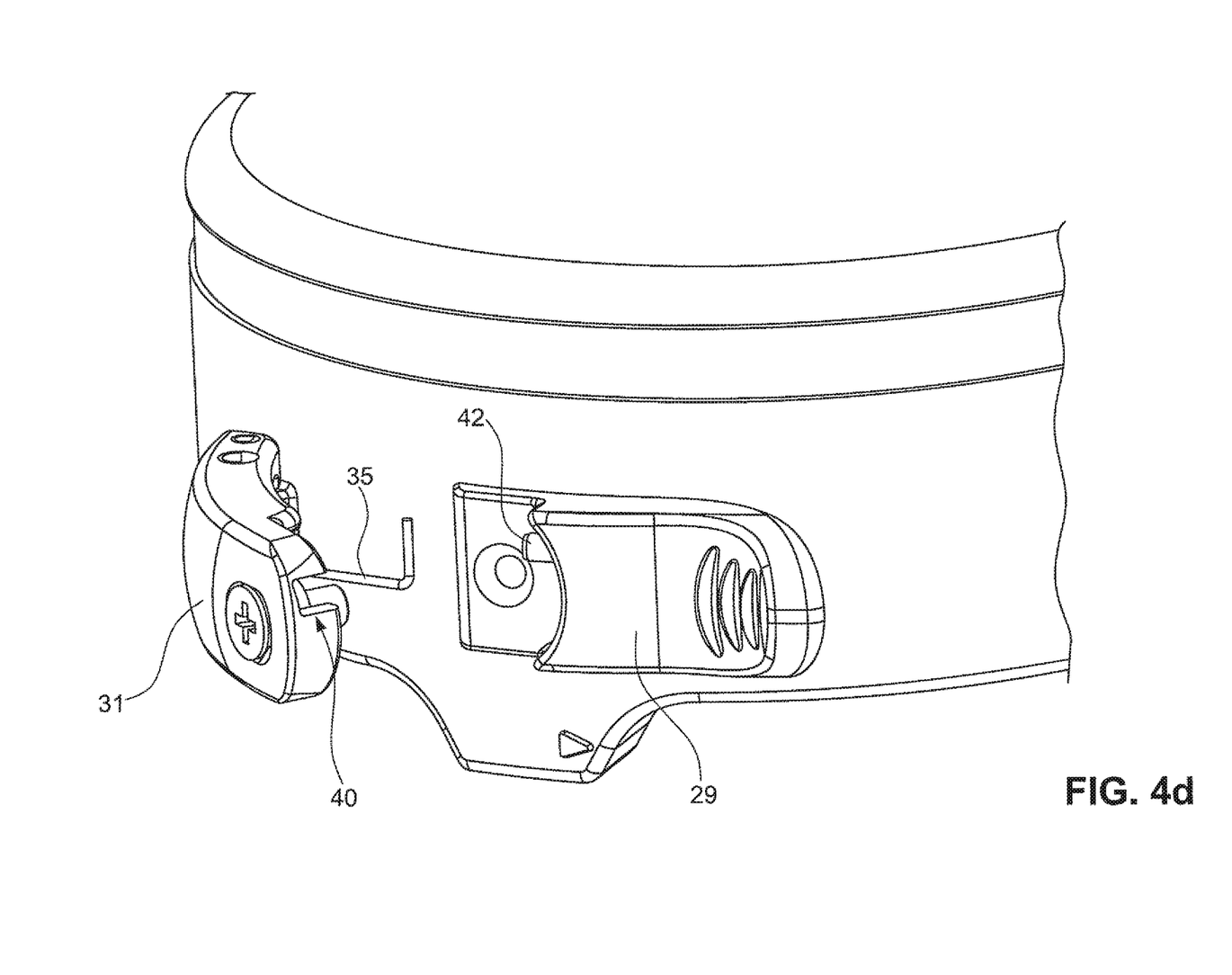
Figure 4E:
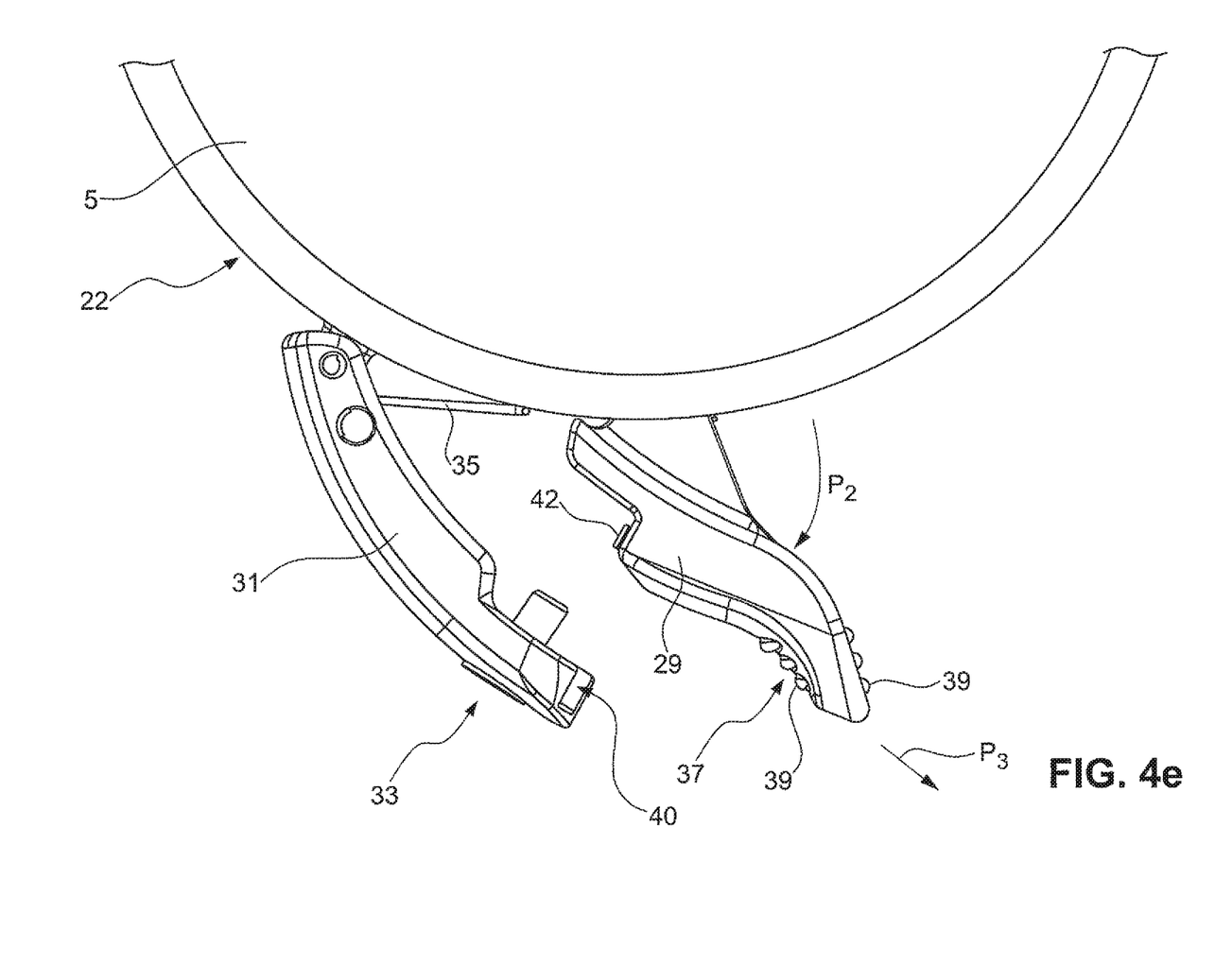

If the force-locking and form-locking connection between interlock element 29 and interlock receiver 31 is released by loosening safety screw 33, the state shown in FIGS. 4c, d results. Interlock receiver 31 is pivoted by spring element 35 away from the peripheral surface 22 of second component 5 in the direction shown by arrow P1 and protrudes outwards. Fitting members 41, 43 have slid apart. In this position, it is now possible for interlock element 29 to pivot off peripheral surface 22 in the direction shown by arrow P2 (FIG. 4e), thus resulted in the state shown in FIG. 4e. By engaging grip recess 37 and protrusions 39, it is then easy for the operator to pull interlock element 29, and locking element 15 with it, away from second component 5 in the direction shown by arrow P3, thus resulting in the state shown in FIG. 4a. The locking element is inserted in essentially the same way, but in reverse order.

Figure 5:
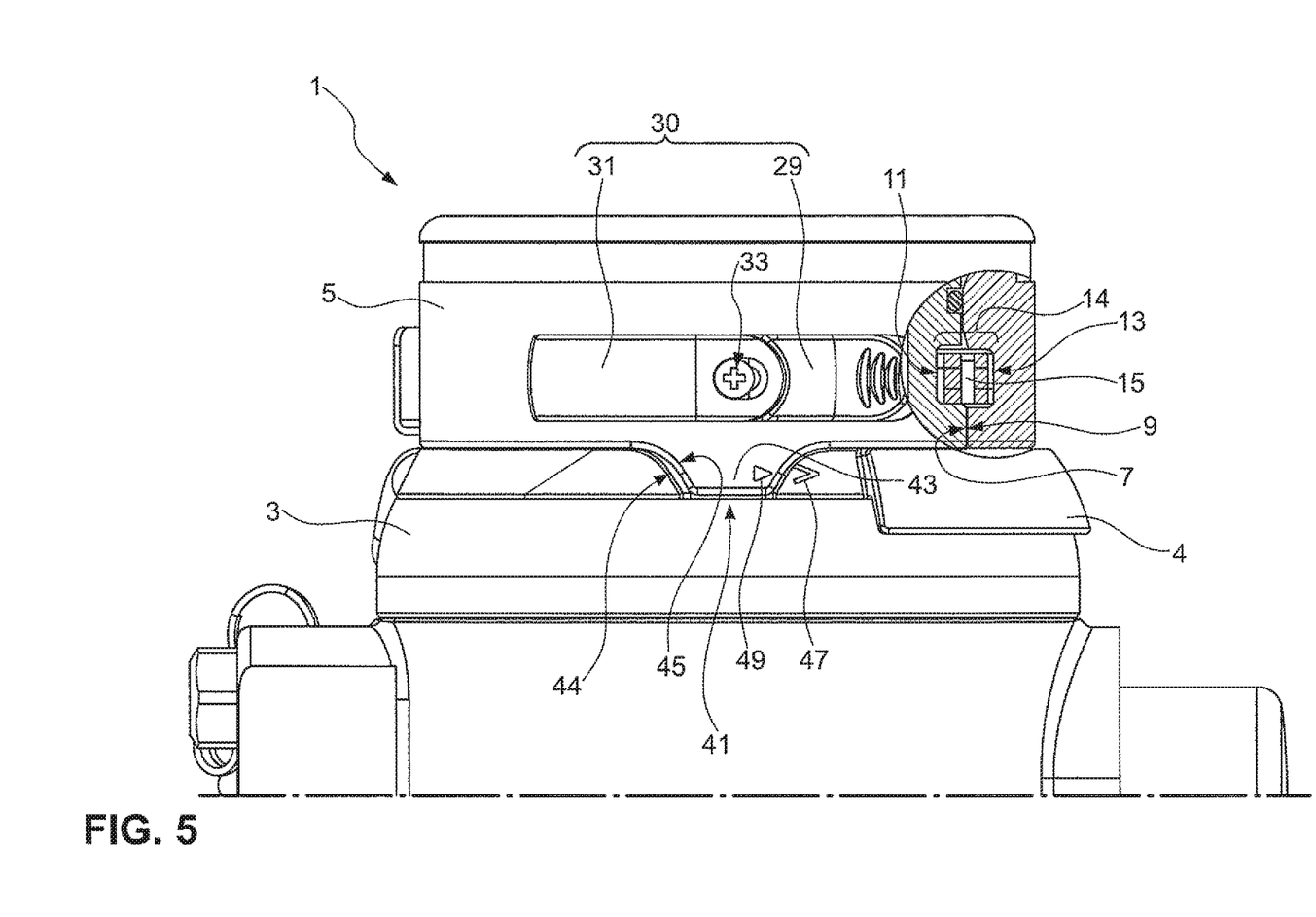
FIG. 5 shows a schematic partly cutaway side view of the plug-in connection system according to FIGS. 1 to 4e.

FIG. 5, finally, shows a further aspect of assembly according to the invention. Reference is made to FIG. 1 with regard to the partially cutaway area on the right of FIG. 5.

To facilitate assembly of first component 3 and second component 5 to each other, the plug-in connection system has correspondingly designed positioning elements. This includes a first positioning element 41, which is provided as a recess on the front side of first component 3. Positioning element 41 is preferably formed on a ring 4 which can be rotated around first component 3. This allows a fitter to turn the quick-release fastener at any time into a position that is easy for him to reach. It is also preferable that ring 4 is clipping onto first component 3. The second component also has a second positioning element 43 in the form of a protrusion which is dimensioned to match recess 41. Insertion bevels 44 are formed on ring 4 to the sides of positioning element 41, and insertion bevels 45 which facilitate engagement of positioning elements 41, 43 in each other are likewise formed on positioning element 43 of the second component. Haptic support is provided by means of ring 4, which makes it easier for the fitter to recognize whether components 3, 5 are fully plugged into one another so that interlocking can be carried out.

As a visual aid, a first mark 47 is arranged on first component 3, in particular on ring 4, and a second mark 49 is arranged on second component 5. When marks 47, 49 are aligned with each other, as in the state shown in FIG. 5, it is visually apparent to the operator that components 3, 5 are fully plugged into one another, and locking element 15 can be fitted.

LIST OF UTILIZED REFERENCE NUMBERS

1 Plug-in connection system
3 First component
4 Ring
5 Second component
7 Outer peripheral surface
9 Inner peripheral surface
11 First recess
13 Second recess
14 Locking element channel
15 Locking element
15a Locking element member
17 Sealing element
19 Opening
20 Locking element safety device
21 Channel end portion
23 Retainer
25 Engagement member for retainer
27 Recess, engagement member
29 Interlocking element
30 Locking element interlock mechanism
31 Interlock receiver, locking element interlock mechanism
33 Safety screw
35 Spring element, locking element interlock mechanism
37 Recessed grip
39 Protrusion
40, 42 Fitting elements
41 Positioning element, first component
43 Positioning element, second component
44 Insertion bevel, first component
45 Insertion bevel, second component
47 Mark, first component
49 Mark, second component

What is claimed is:

1. A plug-in connection system for fluid-conducting components of fire extinguishing systems, comprising:
a first component,
a second component, wherein the first and the second component can be plugged into one another,
a locking element that secures the first and the second component to one another when the components are fully plugged into one another, and
a corresponding positioning element for unique alignment of the components with each other is formed on each of the first and second components,
wherein the corresponding positioning element of one of the first and second components comprises a recess formed on a front side of the one of the first and second components, wherein a ring comprises the recess, wherein the ring can be rotated around the one of the first and second components, and
wherein the corresponding positioning element of the other of the first and second components comprises a corresponding protrusion provided on a front side of the other of the first and second components.

2. The plug-in connection system according to claim 1, wherein the first component comprises an outer peripheral surface and a first recess in the peripheral surface, and the second component comprises an inner peripheral surface and a second recess in the inner peripheral surface, wherein, when the components are fully plugged into one another, the recesses lie opposite one another and define a locking element channel, wherein the locking element which, when the components are fully plugged into one another, can be inserted into the locking element channel until an interlock position is reached and at least part of the locking element engages in both recesses in the interlock position, and wherein the plug-in connection system further comprises a locking element safety device for reversibly releasably securing the locking element on the first and/or second component.

3. The plug-in connection system according to claim 1, wherein the corresponding positioning elements are arranged in such a way that the first and second components are unable to be fully plugged in until the positioning elements engage in each other.

4. The plug-in connection system according to claim 3, wherein one or both of the positioning elements have insertion bevels.

5. The plug-in connection system according to claim 4, wherein the first and the second component are each selected from the list: pipes, end caps, valves, or fluid-conducting flow elements.

6. The plug-in connection system according to claim 4, wherein the insertion bevels are formed on the ring at sides of the recess.

7. The plug-in connection system according to claim 6, wherein the insertion bevels are formed on the protrusion.

8. The plug-in connection system according to claim 3, wherein the ring is clipped onto the one of the first and second components.

9. The plug-in connection system according to claim 3, wherein the ring encircles a portion of the one of the first and second components to form the recess.

10. The plug-in connection system according to claim 2, wherein the locking element is embodied as an interlock chain having a plurality of chain links.

11. The plug-in connection system according to claim 3, wherein a first mark is arranged on the corresponding positioning element of the one of the first and second components and a second mark is arranged on the corresponding positioning element of the other of the first and second components, wherein the first mark and second mark are aligned when the components are fully plugged into one another.

12. The plug-in connection system according to claim 11, wherein the ring comprises the first mark and the protrusion comprises the second mark.

* * * * *